United States Patent [19]

Thurlow et al.

[11] Patent Number: 6,057,841

[45] Date of Patent: May 2, 2000

[54] SYSTEM AND METHOD FOR PROCESSING ELECTRONIC MESSAGES WITH RULES REPRESENTING A COMBINATION OF CONDITIONS, ACTIONS OR EXCEPTIONS

[75] Inventors: Scott A. Thurlow, Kirkland; William J. Bliss, Medina; Douglas E. Stumberger, Kirkland; David R. Goodhand, Seattle; Brian W. MacDonald, Bellevue, all of Wash.

[73] Assignee: Microsoft Corporation, Redmond, Wash.

[21] Appl. No.: 09/217,700

[22] Filed: Dec. 21, 1998

Related U.S. Application Data

[63] Continuation of application No. 08/791,885, Jan. 31, 1997.

[51] Int. Cl.$^7$ ................................................. G06F 13/00
[52] U.S. Cl. ............................ 345/347; 345/352; 706/45; 706/47; 709/204
[58] Field of Search ................................. 345/347, 353, 345/329, 330, 331, 352; 706/45, 47; 709/204

[56] References Cited

U.S. PATENT DOCUMENTS

| | | | |
|---|---|---|---|
| 5,283,856 | 2/1994 | Gross et al. | 706/47 |
| 5,627,764 | 5/1997 | Schutzman et al. | 395/200.37 |

OTHER PUBLICATIONS

Levin et al., "Intelligent Tools for Electronic Networks: A Message Assistant," *OCLC Micro,* vol. 6, No. 5, pp. 29–31 (Oct. 1990).

"Managing the mail-strom," *Infoworld,* pp. 142–143, 146–148, 150, 152, 154, 156, 158, 160, 162, 164–165 (Nov. 14, 1994).

Lai et al., "Object Lens: A 'Spreadsheet' for Cooperative Work," Paper presented at Management in the 1990's, Sloan School of Management, Massachusetts Institute of Technology, Sep., 1988.

Lotus cc:Mail Release 2 E–mail for Windows User's Guide, Chapter 9, pp. 161–180, ©1991–1993.

Windows NT, Version 4.0, Microsoft Exchange Help File, pp. 1–15, 1996.

*Primary Examiner*—Ba Huynh
*Attorney, Agent, or Firm*—Jones & Askew, LLP

[57] ABSTRACT

Processing electronic messages by applying a rule representing a combination of additions, actions, or exceptions. A conditions window is displayed to present conditions upon which a rule for processing electronic messages cause an action to be taken. A condition can be selected in response to an input signal. In turn, an actions window is displayed to present actions that may be taken in response to the selected condition. An action is selected in response to receipt of an input signal. The actions window is updated to display the current state of the rule in a natural language format presented as a contiguous string of appended clauses corresponding to both the selected condition and the selected action. To create a rule including an exception, an exceptions window is displayed to present a list of exceptions associated with the selected condition. In response to receiving an input signal, an exception corresponding to the input signal is selected. Based on the selection of that exception, the exceptions window is updated to display the current state of the rule in a natural language format presented as a contiguous string of appended clauses corresponding to the selected condition, the selected action, and the selected exception.

31 Claims, 10 Drawing Sheets

Which conditions do you want to watch for?

☐ sent directly to me
☐ sent only to me
☐ where I'm not on the 'To' line
☒ from an address list
☐ sent to an address list
☐ with specific words in the subject Rule Description (click an underlined value to edit it)

For each message
    from SOC Hiking Information
process after arrival

| Cancel | Back | Next | Finish |

FIG.6c

Which actions do you want to take?

☐ file it in the designated folder
☐ file a copy in the designated folder
☐ delete it
☐ forward it to an address list
☐ reply using a specific template
☐ notify me using a specific message Rule Description (click an underlined value to edit it)

For each message
    from SOC Hiking Information
process after arrival

| Cancel | Back | Next | Finish |

FIG.7a

Which actions do you want to take?

☒ file it in the <u>designated</u> folder
☐ file a copy in the <u>designated</u> folder
☐ delete it
☐ forward it to <u>an address list</u>
☐ reply using <u>a specific template</u>
☐ notify me using <u>a specific message</u>

Rule Description (click an underlined value to edit it)

For each message
    from <u>SOC Hiking Information</u>
file it in the <u>designated</u> folder
process after arrival

[ Cancel ] [ Back ] [ Next ] [ Finish ]

Which actions do you want to take?

☒ file it in the <u>designated</u> folder
☐ file a copy in the <u>designated</u> folder
☐ delete it
☐ forward it to <u>an address list</u>
☐ reply using <u>a specific template</u>
☐ notify me using <u>a specific message</u>

Rule Description (click an underlined value to edit it)

For each message
    from <u>SOC Hiking Information</u>
file it in the <u>Hiking</u> folder
process after arrival

[ Cancel ] [ Back ] [ Next ] [ Finish ]

Add any exceptions
- ☐ except where I'm not on the 'To' line
- ☐ except if from an address list
- ☐ except if sent to an address list
- ☐ except if subject contains specific words
- ☐ except if body contains specific words
- ☐ except if tagged for follow up

805

Rule Description (click an underlined value to edit it)

For each message
    from SOC Hiking Information
file it in the Hiking folder
process after arrival

810

| Cancel | Back | Next | Finish |
| 820 | 825 | 830 | 835 |

Add any exceptions
- ☐ except where I'm not on the 'To' line
- ☐ except if from an address list
- ☐ except if sent to an address list
- ☐ except if subject contains specific words
- ☒ except if body contains specific words
- ☐ except if tagged for follow up

805

Rule Description (click an underlined value to edit it)

For each message
    from SOC Hiking Information
file it in the Hiking folder
except if body contains specific words
process after arrival

810

| Cancel | Back | Next | Finish |

FIG. 8b

Add any exceptions

- ☐ except where I'm not on the 'To' line
- ☐ except if from an address list
- ☐ except if sent to an address list
- ☐ except if subject contains specific words
- ☒ except if body contains specific words
- ☐ except if tagged for follow up

Rule Description (click an underlined value to edit it)

For each message
    from SOC Hiking Information
file it in the Hiking folder
except if body contains Appalachian Trail
process after arrival

[ Cancel ] [ Back ] [ Next ] [ Finish ]

FIG. 8c

Which conditions do you want to watch for?

- ☐ from Tom Smith
- ☐ sent to Tom Smith
- ☐ with Hiking Sale in the subject
- ☐ with Hiking Sale in the subject or body
- ☐ the sender has marked as low importance
- ☐ the sender has marked as normal sensitivity

Rule Description (click an underlined value to edit it)

For each message
process after arrival

[ Cancel ] [ Back ] [ Next ] [ Finish ]

FIG. 9a

Which actions do you want to take?

- ☐ file it in the Hiking folder
- ☐ file a copy in the Hiking folder
- ☐ delete it
- ☐ forward it to an address list
- ☐ reply using a specific template
- ☐ notify me using a specific message Rule Description (click an underlined value to edit it)

For each message
    with Hiking Equipment Sale in the subject
process after arrival

| Cancel | Back | Next | Finish |

SYSTEM AND METHOD FOR PROCESSING ELECTRONIC MESSAGES WITH RULES REPRESENTING A COMBINATION OF CONDITIONS, ACTIONS OR EXCEPTIONS

RELATED APPLICATIONS

The present application is a continuation of non-provisional patent application entitled "System and Method for Creating, Editing, and Distributing Rules for Processing Electronic Messages", filed on Jan. 31, 1997 and assigned U.S. application Ser. No. 08/791,885, pending.

TECHNICAL FIELD

The present invention relates to a system and method for organizing electronic messages, and more particularly relates to an improved system and method for creating, editing, and distributing rules for automatically processing electronic messages.

BACKGROUND OF THE INVENTION

Electronic mail (e-mail) and other types of electronic messages are becoming extremely popular. Business users increasingly rely on electronic messages to share ideas, transmit documents, schedule meetings, and perform a multitude of other everyday tasks.

These tasks may be accomplished by a variety of software programs. For example, e-mail programs facilitate the transmission of messages between users. Messaging-enabled scheduling programs allow users to request and schedule meetings and appointments via electronic messages. Computer programs known as desktop information managers attempt to coordinate the growing stream of electronic communications by incorporating e-mail, a calendar, task management, contact management, notes, and journal features into a single application program.

The increased reliance on electronic messaging has resulted in a great increase in the number of electronic messages a user sends and receives daily. Users who send and receive a large number of e-mail messages would like an effective way to process their e-mail without spending a lot of time sorting through their inbox, deleting, filing, forwarding, and responding to their messages.

In general, this type of processing may be performed by rules or commands that automatically execute specific tasks when user-provided criteria are met. For example, a user may want to file all e-mail from a certain user or regarding a certain subject in a specific folder. In the prior art, this type of function was provided by a programming-type scripting language that was used to specify events and to designate actions for events that meet those conditions. Because it relies on a cryptic, programming-type language, this approach is not very user-friendly.

A more recent prior art approach allows users to build rules by choosing predefined conditions and actions, which are presented via a simple graphical user interface. Although this approach employs a graphical user interface, it does not provide the user with a step-by-step guide through the rules creation process. In this approach, only the most common rules are exposed to the user, and there is very little customization allowed.

Therefore, there is a need in the art for an improved method for creating and editing rules for processing electronic messages. This method should provide an improved user interface for creating and editing rules for handling electronic messages. In addition to an improved user interface, the system should allow rules to be applied at the desktop or at the server or at both, in order to process electronic messages in the most efficient manner.

SUMMARY OF THE INVENTION

The present invention satisfies the above-described needs by providing an improved system and method for creating and editing rules for processing electronic messages. The present invention provides a user interface that guides the user through the process of creating or editing a rule. At each step, the available rules components are displayed as natural language (e.g., English) phrases. As components are selected, the resulting rule is composed and displayed in a natural language format. Variables are displayed in highlighted text. When the user defines a variable, the user-specified definition is displayed in the context of the message. Templates and the ability to create rules based on existing messages further simplify the process of creating rules.

In one aspect, the present invention provides a method for constructing a rule for processing electronic messages. The method includes displaying the current state of the rule in a natural language format. Conditions are displayed and, in response to an input signal indicating the selection of a condition, the selected condition is added to the displayed current state of the rule. Actions are also displayed. In response to an input signal indicating the selection of an action, the selected action is added to the displayed current state of the rule. The rule is then stored for subsequent processing of electronic messages.

More particularly described, the displayed rule includes variables that are displayed as highlighted text in the context of the natural language format. Upon receipt of an input signal indicating the selection of the highlighted text, a dialog is displayed in order to allow the selection of a definition for the variable. Upon receipt of an input signal indicating the selection of the definition for the variable, the rule is displayed with the definition in the place of the original variable.

In another aspect, the present invention provides a method for constructing a rule for processing electronic messages. The method includes displaying a list of rule templates and receiving an input signal indicating the selection of one of the rule templates. A condition and action associated with the selected template are then displayed. The current state of the rule is displayed in a natural language format. The rule is then stored for subsequent processing of electronic messages.

In yet another aspect, the present invention provides a method for distributing electronic message processing rules between a client computer and a server computer. The method includes displaying the current state of the rule in a natural language format. Conditions are displayed and, in response to the selection of one of the conditions, the selected condition is added to the displayed current state of the rule. Actions are also displayed. An input selecting one of the actions is received and the selected action is added to the displayed current state of the rule. The method includes determining whether the rule may be run on a server. If so, the rule is uploaded to the server.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 7, consisting of FIGS. 7a, 7b, and 7c, illustrates the information displayed in an actions window.

FIG. 8, consisting of FIGS. 8a, 8b, and 8c, illustrates the information displayed in an exceptions window.

FIG. 9, consisting of FIGS. 9a and 9b, illustrates information displayed when the "rules from context" options is selected.

DETAILED DESCRIPTION

Figure 1:
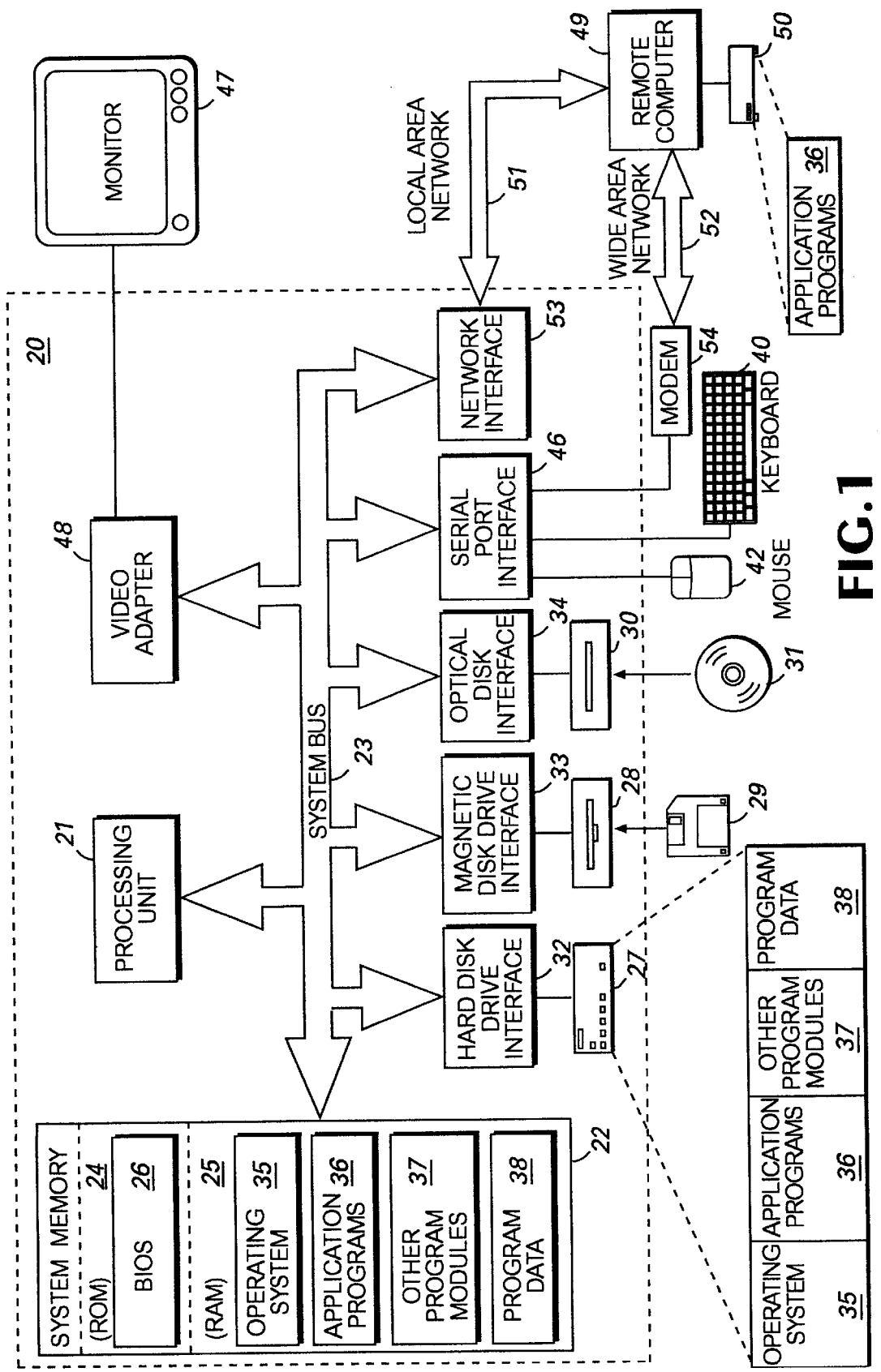
FIG. 1 is a block diagram of a personal computer that provides the operating environment for an embodiment of the present invention.

The present invention is directed toward a method and system for creating and editing rules for processing electronic messages. In one embodiment, the invention is incorporated into a desktop information manager application program entitled "OUTLOOK 97," which is published by Microsoft Corporation of Redmond, Wash. Briefly described, the "OUTLOOK 97" program allows users to manage their own calendar, messages, tasks, notes, and contacts and to share this information with others. The present invention allows users to easily create and edit rules that automatically process these electronic messages.

Referring now to the drawings, in which like numerals represent like elements throughout the several figures, aspects of the present invention and an exemplary operating environment will be described.

Exemplary Operating Environment

FIGS. 1–4 illustrate various aspects of the preferred computing environment in which the present invention is designed to operate. Those skilled in the art will immediately appreciate that FIGS. 1–4 and the associated discussion are intended to provide a brief, general description of the preferred computer hardware and program modules, and that additional information is readily available in the appropriate programming manuals, user's guides, and similar publications.

The Computer Hardware

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The MAPI Messaging Architecture

The operating system 35 provides the basic interface between the computer's resources, the user, and the application programs 36. As discussed earlier, an embodiment of the present invention is incorporated in the "OUTLOOK 97" application program, which is designed to operate with Microsoft Corporation's "WINDOWS 95" or "WINDOWS NT" operating systems. The operating system 35 provides a variety of functions or services that allow an application program 36 to easily deal with various types of input/output (I/O) by issuing relatively simple function calls. Generally described, an application program 36 communicates with the operating system 35 by calling predefined functions provided by the operating system 35. The operating system 35 responds by providing the requested information in a message or by executing the requested task.

In the context of the present invention, the primary interaction between the application program and the operating system involves messaging related tasks. The preferred operating system incorporates the Messaging Application Programming Interface (MAPI). The MAPI architecture is designed to make it easy for programmers to write messaging-enabled applications that are independent of the underlying messaging system. MAPI provides high-level functions that can be used to implement sophisticated messaging features with a relatively small amount of code. The code deals with functions for sending, receiving, and addressing electronic messages. The underlying messaging system is completely transparent. MAPI also provides other message-related functionality, such as access to address books.

Figure 2:
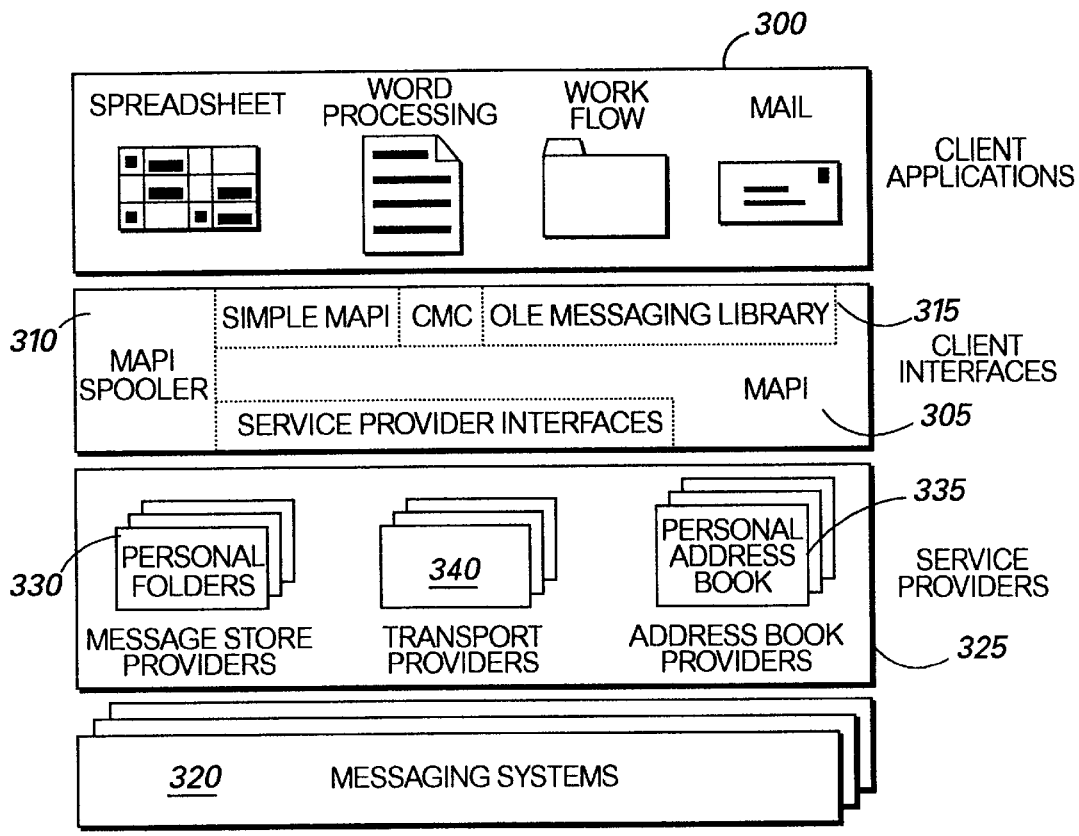
FIG. 2 is a diagram illustrating the modular architecture defined by the Messaging Application Programming Interface (MAPI).

FIG. 2 illustrates the modular architecture defined by MAPI. The client applications 300 are application programs that take advantage of the MAPI subsystem 305. Client applications 300 implement messaging tasks as either their primary or secondary focus. Messaging-based client applications, such as applications that send and receive electronic mail, implement messaging tasks as their primary focus. For non-messaging client applications, which are referred to as being "messaging-enabled" or "messaging-aware," it is a secondary feature.

The MAPI subsystem is made up of the MAPI spooler 310, a common user interface (not shown), and the programming interfaces 315. The MAPI spooler is a separate interface that is responsible for sending electronic messages to and receiving electronic messages from a messaging system. The common user interface is a set of dialog boxes that gives client applications a consistent look and users a consistent way to perform tasks.

The programming interfaces 315 are used by the MAPI subsystem 305, by client applications 300, and by service provider writers. The main programming interface is an object-based interface known as the MAPI programming interface, which is based on the OLE Component Object Model. Client applications may also utilize any of three other interfaces, including simple MAPI, Common Messaging Calls (CMC) and the OLE Messaging Library, which are primarily for messaging-enabled and messaging-aware client applications.

The MAPI spooler 310 is a separate process within the MAPI subsystem 305 and is responsible for sending electronic messages to and receiving electronic messages from a messaging system 320. The spooler runs as a background process and also performs several functions related to electronic message distribution. These include informing a client application when a new message has been delivered, invoking message preprocessing and post processing, generating reports that indicate that message delivery has occurred, and maintaining status on processed recipients.

The MAPI service providers 325 are located between MAPI subsystem 305 and the messaging systems 320. Service providers are drivers that connect MAPI client applications 300 to an underlying messaging system 320. Most messaging systems include three types of service providers: message store providers 330, address book or directory providers 335, and message transport providers 340. The service providers work with MAPI to create and send electronic messages in the following way. Electronic messages are created using a form that is appropriate for the specific type, or class, of message. The completed electronic message is addressed to one or more recipients. When the client sends the message, the message store provider 330 checks that each recipient has a unique and valid address and that the message has all of the information necessary for transmission. If there is a question about a recipient, such as can occur when there are multiple recipients with the same name, an address book provider resolves the ambiguity. The electronic message in then placed in the outbound queue.

Address book providers 335 handle access to directory information. Depending on the type of recipient and the address book provider, there is a wide range of information that can be made available. For example, all address book providers 335 store a recipient's name, address, and address type and organize the data using one or more containers. MAPI integrates all the information supplied by the installed address book providers into a single address book, thereby presenting a unified view to the client application. The users of client applications can view the contents of address book containers and in some cases modify it. MAPI's Personal Address Book is an example of a modifiable address book container that allows new entries to be added and exiting entries to be modified or deleted.

Figure 3:
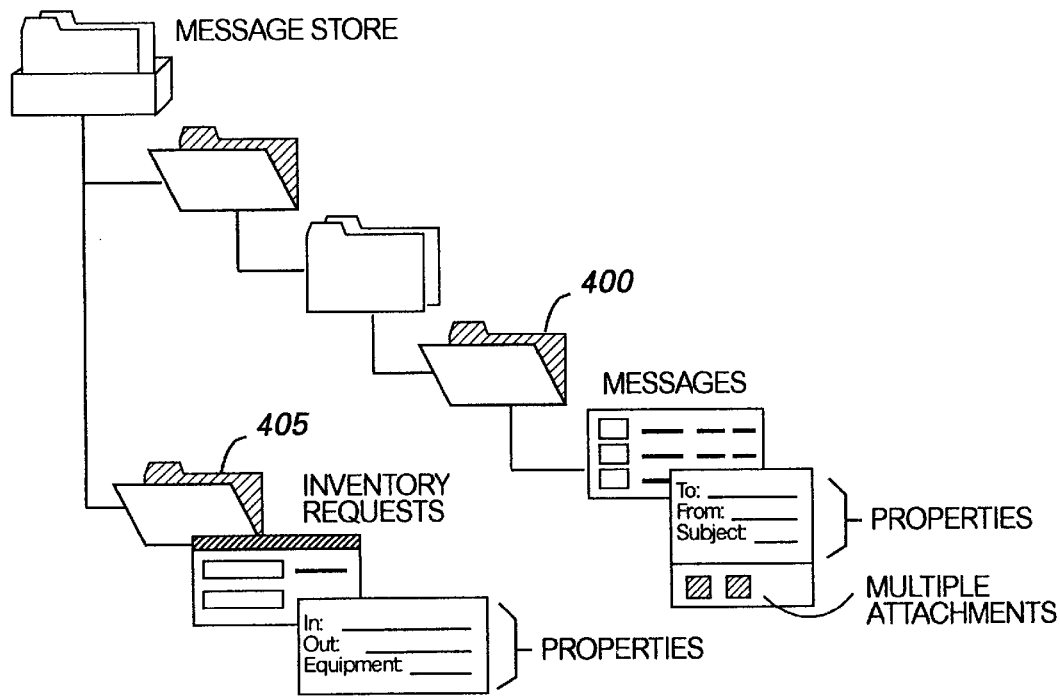
FIG. 3 is a diagram illustrating the hierarchical arrangement of a MAPI message store.

Message store providers 330 handle the storage and retrieval of electronic messages and other information for the users of a client application. As illustrated in FIG. 3, the message information is organized using a hierarchical system known as a message store, which is implemented in multiple levels, with containers called folders holding electronic messages of different types. There is no limit to the number of levels in a message store, and folders can contain many sub-folders.

Electronic messages are units of data that are transferred from one user or application to another user or application. Every message contains some text and envelope information, which is used for transmission. Some electronic messages include one or more attachments, or additional data related to and transported with a message. The attachments and additional data may be in the form of a file, another message, or an OLE object.

Transport providers 340 handle message transmission and reception. They control the interaction between the MAPI spooler 310 and the underlying messaging system 320. They also implement security if necessary and take care of any pre-processing and post-processing tasks that are required. Client applications 300 communicate with the transport providers 340 through a message store provider 330. When an incoming message is detected, the transport provider informs the MAPI spooler and the message is delivered to the appropriate message store. To handle outgoing messages, the message store moves the message to the outbound queue, informs the MAPI spooler, and the spooler transfers it to the appropriate transport providers.

The operation of these MAPI components is illustrated by describing the flow of an electronic message through these components. The user of a client application 300 sends an electronic message to one or more recipients. A message store provider 330 initiates the sending process and formats the message with additional information needed for transmission. The MAPI spooler 310 receives the electronic message, performs any required preprocessing, and delivers it to the appropriate transport provider 340. The transport provider 340 gives the message to its messaging system 320, which sends it to the intended recipient(s). When an electronic message is received, the transport provider 340 receives a message from its messaging system 320 and notifies the MAPI spooler 310. The spooler 310 performs any necessary post processing and informs the message store provider 330 that a new message has arrived. The notification causes the client application 300 to refresh its message display, which enables the user to read the new message.

Client application users can access a summary view of the messages contained within each folder or view them individually with a form. Whether the client displays a standard form supplied by MAPI or a custom form supplied by a form developer depends on the type, or class, of the message. In FIG. 3, the first folder 400 contains note messages and uses the MAPI standard note form. The second folder 405 contains inventory request messages and uses a custom inventory form. The information on both forms represents the properties, or attributes, of the message. Messages are the units of data transferred from one user to another. Every message contains some text, which is formatted simply or more intricately depending on the form that is used, and envelope information that is used for transmission.

A MAPI property is an attribute of a MAPI object, and describes something about the object, such as the subject line of a message of the address type of a distribution list. Every MAPI property has a value, a type, and an identifier. The value is the descriptive data, such as the text in a message body. The type describes the kind of data, such as a string, numeric, or Boolean. The identifier is the number that uniquely describes the property. The identifier and type are combined to form a "property tag," which is a constant that can be used to easily refer to the property. Property tags share a common format. They begin with the prefix "PR" and are made up of one or more words that describe the property. For example, PR_MESSAGE_BODY is the tag for the message body property. The property tag and value are stored together in system memory 15 (FIG. 1) as a single data structure.

MAPI also employs "profiles," which are collections of information about the message services and service providers that a user of a client application 300 wants to be available during a particular MAPI session. Every user has at least one profile. Multiple profiles may be used in some cases. For example, a user might have one profile to work with a server-based message store service and another profile to work with a message store service on the local computer. A user may have profiles on more than one computer. Similarly, a computer may store profiles for more than one user. Profiles provide a flexible way to select combinations of message systems.

In the MAPI environment, a form is a viewer for an electronic message. Each message has a message class that determines the particular form that is used as its viewer. MAPI defines a few messages classes and has implemented the forms for viewing these messages. Client application developers can create new message classes and custom forms for viewing messages with the new classes.

Figure 4:
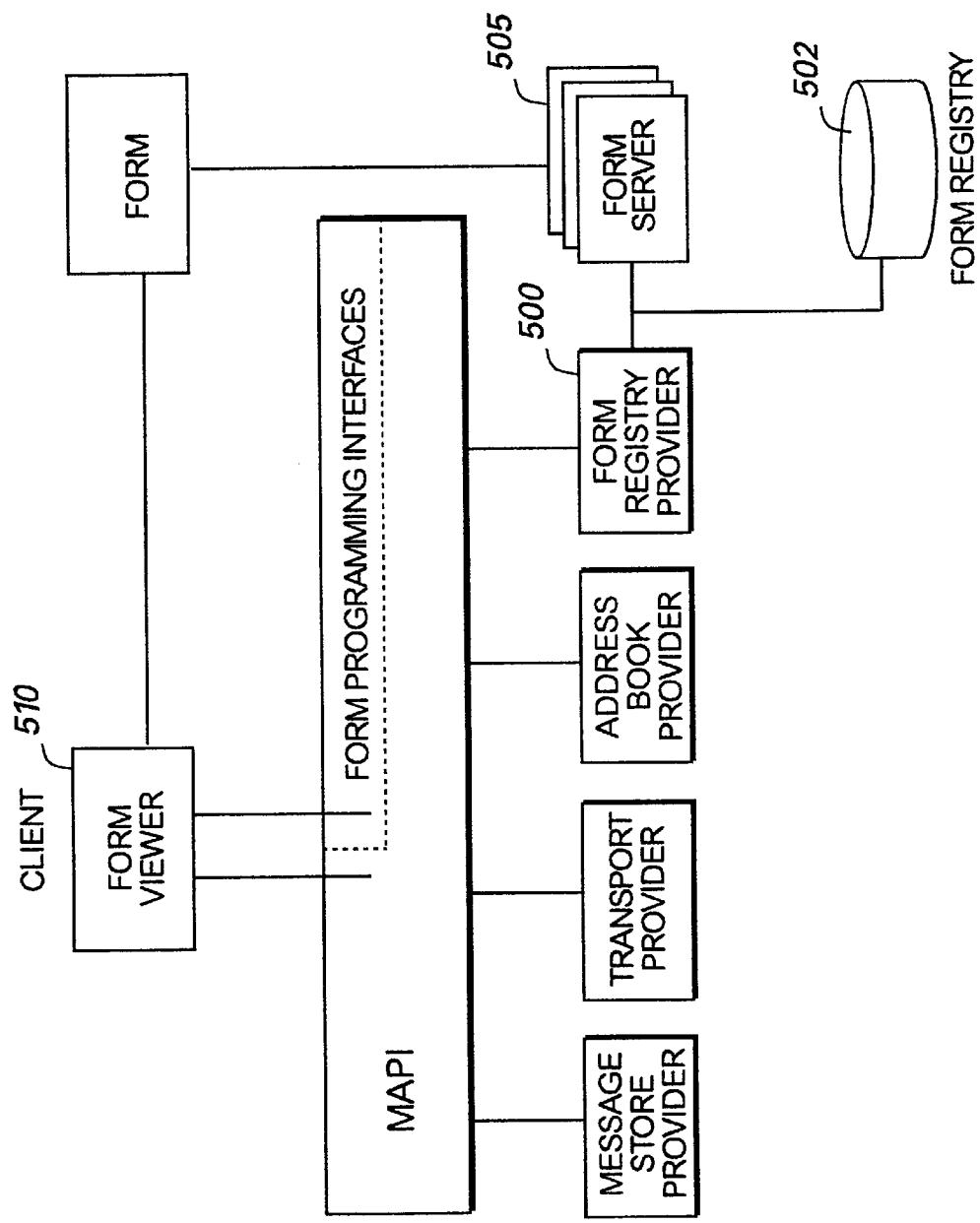
FIG. 4 is a diagram illustrating the MAPI form architecture.

Every custom form implements a set of standard menu commands (e.g., open, create, delete, and reply) and a set of commands that are specific to that particular form. These commands are also referred to as "verbs." FIG. 4 illustrates the MAPI form architecture, which involves three main components: a form registry provider 500, a form server 505, and a form viewer 510.

The form registry provider 500 maintains a library of information about all of the forms available on the computer and enables the client to select a form that is suitable for the message being displayed. Form data is stored in a form registry 502, which is stored in one of the computer's memory storage devices. The form server 505 is responsible for displaying the form and providing the information for the display. The form server manages the user's interaction with the form by interpreting the menu selections and processing the messages. The form viewer 510 is a component within a client application that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft Corporation, and which is incorporated herein by reference.

An Exemplary Application Program

As mentioned above, an exemplary embodiment of the present invention is represented by the "OUTLOOK 97" desktop information manager. The preferred client application is divided into several modules, including a calendar manager, a task list manager, a contact manager, a message manager (e-mail), and a notes manager. In the preferred client application, integration between the modules is both simple and extensive because all information is stored in a MAPI data store, which is an extensible, object-oriented database. The preferred application program incorporates the features of MAPI version 1.0.

All folders (containers) contain objects, or items. In the preferred application program, there are a variety of kinds of items: e-mail items, appointment items, task items, address items, etc. Items have a set of fields and a behavior associated with them. For example, an e-mail item has To, From, CC, Subject, date and time fields among others. The behavior of e-mail items includes knowledge of what it means to Forward or Reply/Reply All.

In the preferred application program, items consist of a variety of data, which are stored as MAPI properties. A user views and interacts with an item in the context of a form, which includes a variety of fields. In some cases, a field maps directly to a MAPI property. However, there can be a many-to-many mapping between a form's fields and the MAPI properties in which the corresponding data are stored. Similarly, there may be properties that are not displayed in any of a form's fields.

In the preferred application program, each item is initially created from a template, which provides a "mold" for the new items. A template describes the fields and properties associated with the item, including the data types, default values, formatting rules, etc. For example, there would be a default template for each type of item listed above: appointments, to-do items, notes, e-mail messages, etc.

From this brief description, those skilled in the art will appreciate that the preferred application program provides a wide variety of features and functions in addition to those included in the brief description presented above. For additional information regarding the "OUTLOOK 97" application program, the reader may refer to the documentation that is distributed with the program.

The Preferred Method for Creating and Editing Rules for Processing Electronic Messages Electronic message processing rules are user-defined instructions for managing incoming and outgoing electronic messages. Rules execute specific tasks when user-defined criteria are met and provide an effective way to process electronic messages without requiring users to spend a lot of time sorting through their inboxes deleting, filing, and responding to their messages. The present invention provides an improved system and method for creating and editing rules for processing electronic messages, such as e-mail, meeting requests, and task requests. Generally described, the invention is embodied in a "Rules Wizard," which divides the process into discrete steps and provides a user-friendly interface for creating and editing rules. At each step, the user selects the parameters that constitute the rule. As parameters are selected, the rule is composed and presented to the user in the form of a natural language (e.g., English) sentence, instead of in a programming-type language. If the rule requires more information from the user, the user is prompted by highlighted text within the natural language sentence itself. The user can then select the highlighted text and define the variable. The rule creating process is further simplified by the use of templates and context-specific rules. Once created, the rules may be executed by the client application or the mail server.

Each rule includes conditions and actions, and may also include exceptions. "Conditions" are the criteria that are available for making new rules. A rule will not be executed unless its conditions are satisfied. Each rule typically contains at least one condition. Multiple conditions can be strung together with "and" clauses. In this case, all of the conditions must be met for the rule to execute. Alternatively, multiple conditions could be joined using the disjunctive connector "or" so that action will be taken if one of several conditions is present. If a rule contains no conditions, it will be applied to every sent or received item (depending on whether it is a send rule or a delivery rule).

"Actions" are the events that occur when the rule's conditions are met. Each rule typically includes at least one action. Multiple actions can be assigned to a single rule. If multiple actions are to be executed, the order of execution may be critical to successful execution of the rule. For example, if a user wants to forward a message and then delete it, the steps must be carried out in that order. If the message is deleted first, it will not be available to be forwarded. In the "OUTLOOK 97" program, actions are organized by priority and are executed in order of priority in order to avoid such problems.

"Exceptions" allow a user to identify criteria or conditions that will prevent a rule from executing. Multiple exceptions may be combined with "or" clauses. If multiple exceptions are included, the actions associated with the rule will not be executed if any of the exceptions are true. Exceptions are optional.

Those skilled in the art will appreciate that although rules are presented or displayed to the user in a natural language format, each rule is also stored in a machine-readable format for execution by the computer. Generally described, the machine readable form of a rule includes a Boolean expression that represents the natural language rule's condition and exception clauses, and a list of actions that represent the natural language phrase's actions clauses.

The Boolean expression for each natural language condition or exception clause is of the form:

[PROPERTY] [COMPARISON OP] [VALUE]

where PROPERTY is the MAPI property or properties that correspond to the property mentioned in the rule, COMPARISON OP is the operator used for the comparison, and VALUE is the value the user specified for the variable. For example, PR_SUBJECT is the MAPI property used for a message's "subject" field, and the operator includes comparisons such as checking to see if two values are equal.

The machine-readable format for each natural language action clause is of the form:

[ACTION] [PARAMETER 1] [PARAMETER 2] [. . . ]

where ACTION is an identifier for the selected action and PARAMETER N is a parameter associated with the action. For example, the PARAMETER may be the identifier of the folder into which matching messages are to be filed.

The rules feature associated with the "OUTLOOK 97" program employs a "Rules Wizard" to provide step-by-step guidance during rule creation and editing. The Rules Wizard uses a sequence of windows to walk the user through the process of creating or editing a rule. A Start/Templates window provides a list of available templates, a switch for selecting send/delivery rules, and a rule description area. A Conditions window directs the user to select the conditions on which the rule will act. An Actions window allows the user to choose the action or actions the rule will execute. An Exceptions window gives the user a listing of available exceptions. Finally, a Naming window allows the user to name the rule and turn it on or off.

Figure 5:
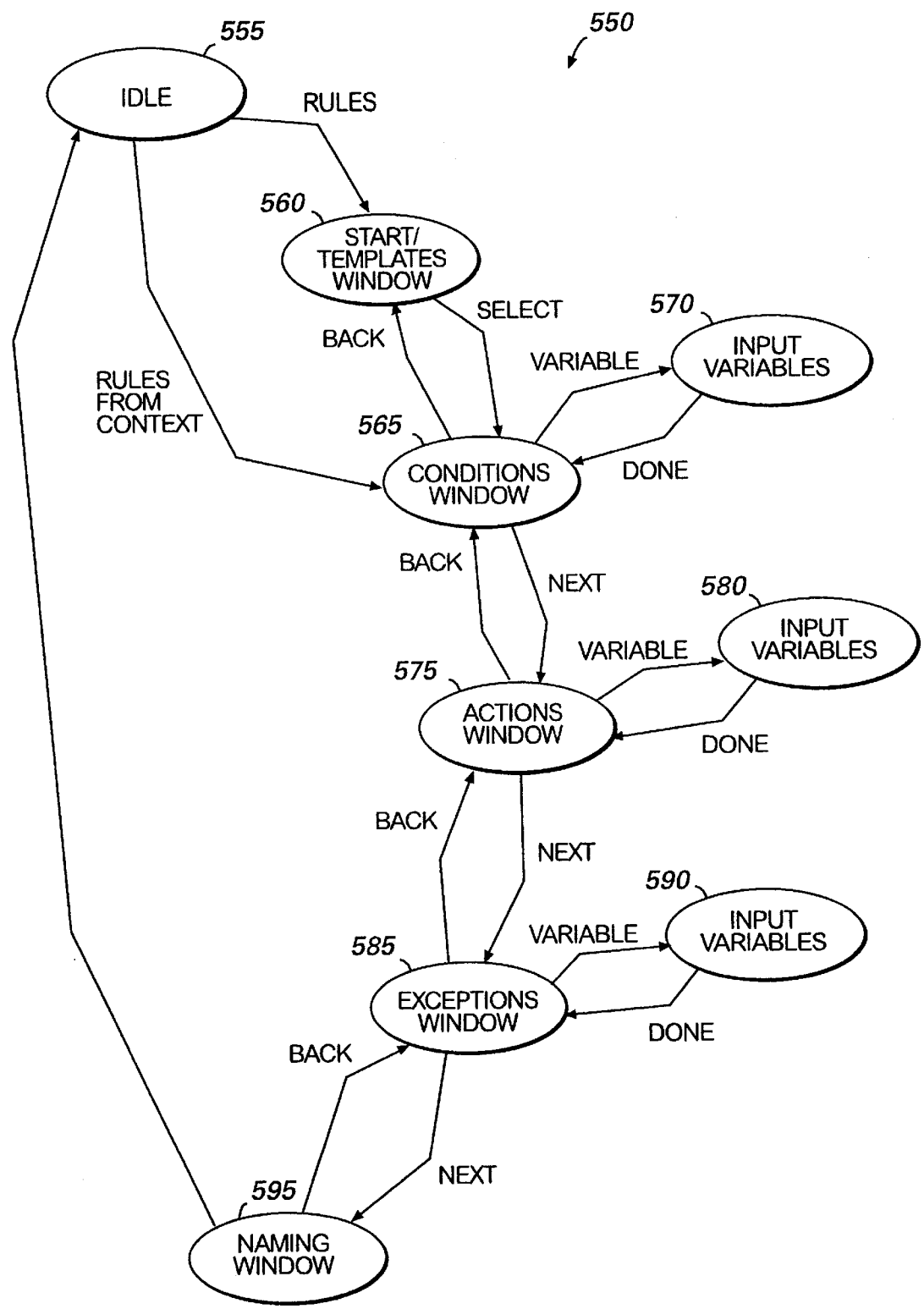
FIG. 5 is a state diagram illustrating a method for creating and editing rules for processing electronic messages.

FIG. 5 is a state diagram of the method 550 carried out by the Rules Wizard. The method begins at the idle state 555. When a user selects the create/edit rule function, the method 550 proceeds to state 560 and displays a Start/Templates window. This window allows the user to create a new rule or edit or rename an existing rule. The user may view a list of previously created rules, which are stored in the user's MAPI profile. If the user desires to create a new rule, the user may choose one of three options. First, the user may simply proceed to choose the conditions and actions from a list of available possibilities. Optionally, the user may select templates that are designed to carry out certain functions. The user may also select a "rules from context" option from the idle state 555, which builds rules based on the properties of the message currently being viewed. Each of these options is discussed in more detail below.

When the user selects one of the available options at state 560 or selects the "rules from context" option from the idle state 555, the method 550 proceeds to state 565 and displays a conditions window. The conditions window allows the user to choose the conditions on which the rule will act. In conditions that include variables, the variables are displayed as underlined text in order to indicate that the variables are defined via hypertext links. After a condition is selected, the user has the opportunity to select the hypertext link and define the variable from a dialog or other user interface object (state 570). The user may also return to state 560 by selecting the "back" option. A list of exemplary conditions for display in the conditions window is provided in Table I.

Figure 6A:
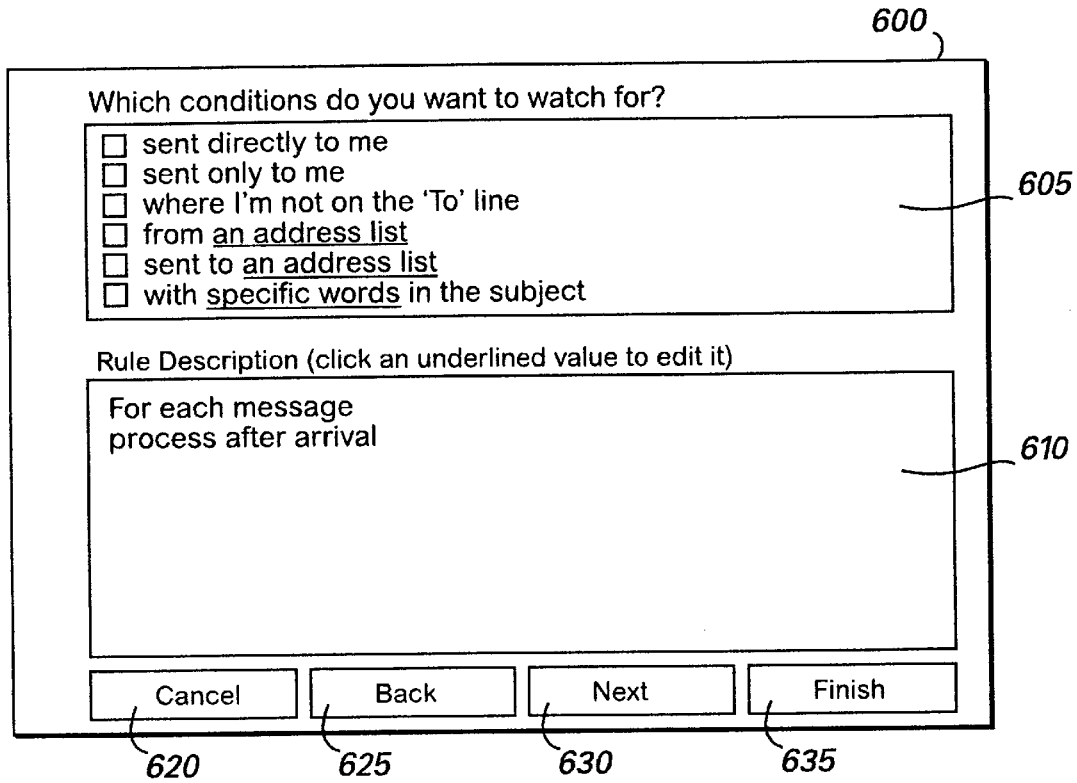
FIG. 6, consisting of FIGS. 6a, 6b, and 6c, illustrates the information displayed in a conditions window.
Figure 6B:
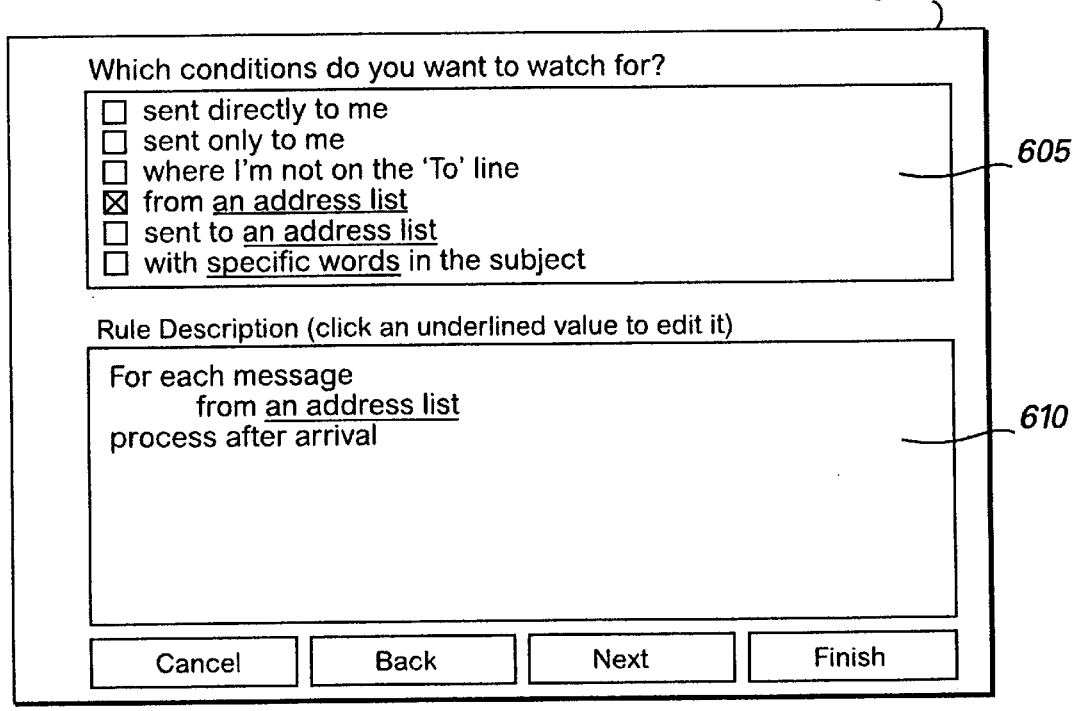

TABLE I if sent directly to me
if sent only to me
if I am on the cc line
if sent directly to me or I am on the cc line
where I'm not on the 'To' line
if from an address list
if sent to an address list
if subject contains specific words
if body contains specific words
if subject or body contain specific words
if tagged for follow-up
if the sender has marked it as important
if the sender has marked it as sensitive
if assigned to a category
if it is an out-of-office notification
if it has an attachment FIGS. 6a, 6b, and 6c illustrate the type of information provided in the conditions window 600 as the user works through the process of selecting available conditions and providing required parameters (see states 565 and 570 of FIG. 5). The conditions window includes a conditions display area 605 and a rule description area 610. The conditions display area 605 displays the conditions that are available to the user. The rule description area 610 includes a natural language statement of the rule as it is constructed. The conditions window 600 also includes controls labeled cancel 620, back 625, next 630, and finish 635. These controls perform the common functions of allowing a user to navigate between windows and to cancel or complete an operation.

FIG. 6a illustrates the state of the conditions window 600 when the Rules Wizard first displays the window (FIG. 5, state 565). The conditions display area 605 includes a list of the conditions from which the user may choose. A check box is located next to each condition. At this point in the process, the rules description area 610 simply includes the initial phrase of a natural language expression of a rule ("For each message") and a statement indicating that the rule will be applied to messages as they are received. Alternatively, the user may specify that the rule is to be applied after an incoming message is first read, or when an outgoing message is sent. Similarly, rules may be designed to existing folders and their messages immediately, or on a periodic basis. This allows the rules feature to be used to "clean up" folders full of messages.

FIG. 6b illustrates the state of the conditions window 600 after the user has selected the condition "from an addresslist" in the conditions display area 605. When a condition is selected, the rule description area 610 is modified to add the selected phrase to the natural language expression of the rule. Thus, the rule now reads "For each message from an address list" and expresses the conditional portion of the rule in an easy-to-understand natural language format.

The words "an address list" are underlined in order to represent a variable that must be replaced by the user. Those skilled in the art will appreciate that underlined text is commonly used to indicate a hypertext link. In order to define the variable (in this case, an address list), the user moves the cursor over the hypertext portion of the rule as it is displayed in the rules description area 610 and selects the hypertext. The Rules Wizard then displays a dialog (not shown) that allows the user to select from available objects, such as an address list (FIG. 5, state 570).

Those skilled in the art will understand that when a user selects a variable, a dialog is displayed with the appropriate user interface for selecting variables of that type. For example, if the variable holds a mail address, the user gets a window that allows them to pick or enter a mail address. Likewise, if the variable holds a word, the user gets a window that allows them to enter a word.

FIG. 6c illustrates the conditions window 600 after the user has selected a specific address list in place of the variable in the condition statement. In this example, the user has defined the variable with an address list called "SOC Hiking Information." This name has been threaded back into the rule that is displayed in the rule description area 610. Thus, the rule now reads "For each message from SOC Hiking Information." The address list name remains underlined in order to indicate that the address list is a variable. The address list name may be edited by selecting the underlined text in the rule description area 610 of the conditions window 600.

When the user has finished selecting conditions and defining constituent variables, the user selects the Next control 630 and proceeds to select the actions that will form a part of the rules. This causes the method 550 (FIG. 5) to proceed from state 565 to state 575.

At state 575 the Rules Wizard displays an actions window, which provides the user interface that allows the user to select the actions that will take place when the conditions are satisfied. Like the conditions described above, the actions that include variables are displayed as hypertext links. After an action is selected, the user has the opportunity to select the hypertext link and choose the variable from a dialog (state 580). A list of exemplary actions for display in the actions window is provided in Table II.

TABLE II file it in the designated folder
file a copy in the designated folder
delete it
forward it to an address list
reply using a specific template
notify me using a specific message
tag it for follow up in 'n' days
clear follow up
assign to category
play a .wav file
mark it as important
mark it as sensitive FIGS. 7a, 7b, and 7c illustrate the type of information provided in the actions window 700 as the user works through the process of selecting available actions and providing required parameters (see states 575 and 580 of FIG. 5). The actions window includes an actions display area 705 and a rule description area 710. The actions display area 705 displays the actions that are available to the user. The rule description area 710 includes the natural language statement of the rule as it is constructed. The actions window 700 also includes controls labeled cancel 720, back 725, next 730, and finish 735. These controls perform the common functions of allowing a user to navigate between windows and to cancel or complete an operation.

FIG. 7a illustrates the state of the actions window 700 when the Rules Wizard first displays the window (FIG. 5, state 575). The actions display area 705 includes a list of the actions from which the user may choose. A check box is located next to each action. At this point in the process, the rules description area 710 includes the conditional portion of the rule that was defined earlier and the statement indicating that this rule will be applied to messages as they are received.

FIG. 7b illustrates the state of the actions window 700 after the user has selected the action "file it in the designated folder" in the actions display area 705. When a action is selected, the rule description area 710 is modified to add the selected phrase to the natural language expression of the rule. Thus, the rule now reads "For each message from SOC Hiking Information, file it in the designated folder" and expresses the condition and action portions of the rule in an easy-to-understand natural language format.

The word "designated" is underlined in order to represent a variable that must be defined by the user. In order to define the variable (in this case, the destination folder), the user moves the cursor over the hypertext portion of the rule as it is displayed in the rules description area 710 and selects the hypertext. Alternatively, the user may tab to the highlighted hypertext part of the rule and press the "enter" key. In either case, the Rules Wizard then displays a dialog (not shown) that allows the user to select from available objects, such as an address list (FIG. 5, state 580).

FIG. 7c illustrates the actions window 700 after the user has identified a specific folder name in place of the variable in the action statement. In this example, the user has selected a folder called "Hiking." This folder name has been threaded back into the rule that is displayed in the rule description area 710. Thus, the rule now reads "For each message from SOC HikingInformation file it in the Hiking folder." The folder name remains underlined in order to indicate that the folder name is a variable, which may be edited by selecting the underlined text in the rule description area 710 of the actions window 700.

When the user has finished selecting conditions and defining variables, the user selects the Next control 630 and proceeds to select the actions that will form a part of the rules. This causes the method 550 (FIG. 5) to proceed from state 575 to state 585.

At state 585 the Rules Wizard displays an exceptions window, which provides the user interface that allows the user to select specific exceptions to the conditions that were specified earlier. Like the conditions and actions described above, the exceptions that include variables are displayed as hypertext links. After an exception is selected, the user has the opportunity to click on the hypertext link and select the variable from a dialog (state 590). A list of exemplary exceptions for display in the exceptions window is provided in Table III.

TABLE III except if sent directly to me
except is sent only to me
except where I'm not on the 'To' line
except if from an address list
except if sent to an address list
except if subject contains specific words
except if body contains specific words
except if subject or body contains specific words
except if tagged for follow-up
except if the sender has marked it as important
except if the sender has marked it as sensitive
except if assigned to category
except if it is an out-of-office notification
except if it has an attachment FIGS. 8a, 8b, and 8c illustrate the type of information provided in the exceptions window 800 as the user works through the process of selecting available exceptions and defining constituent variables (see states 585 and 590 of FIG. 5). The exceptions window includes an exceptions display area 805 and a rule description area 810. The exceptions display area 805 displays the exceptions that are available to the user. The rule description area 810 includes a natural language statement of the rule as it has been constructed to this point. The exceptions window 800 also includes controls labeled cancel 820, back 825, next 830, and finish 835, which allow a user to navigate between windows and to cancel or complete an operation.

FIG. 8a illustrates the state of the exceptions window 800 when the Rules Wizard first displays the window (FIG. 5, state 585). The exceptions display area 805 includes a list of the exceptions from which the user may choose. A check box is located next to each exception. At this point in the process, the rules description area 810 includes the conditional and action portions of the rule that were defined earlier and the statement indicating that this rule will be applied to messages as they are received.

FIG. 8b illustrates the state of the exceptions window 800 after the user has selected the exception "except if body contains specific words" in the exceptions display area 805. When an exception is selected, the rule description area 810 is modified to add the selected phrase to the natural language expression of the rule. Thus, the rule now reads "For each message from SOC Hiking Information, file it in the Hiking folder except if body contains specific words" and expresses the condition, action, and exception portions of the rule in an easy-to-understand natural language format.

The words "specific words" are underlined in order to represent a variable that must be replaced by the user. In order to define the variable (in this case, the specific words), the user moves the cursor over the hypertext portion of the rule as it is displayed in the rules description area 810 and selects the hypertext. The Rules Wizard then displays a dialog (not shown) that allows the user to specify the words that define the variable (FIG. 5, state 590).

FIG. 8c illustrates the exceptions window 800 after the user has provided specific words in place of the variable in the exception statement. In this example, the user has entered the words "Appalachian Trail." These words have been threaded back into the rule that is displayed in the rule description area 810. Thus, the rule now reads "For each message from SOCHiking Information file it in the Hiking folder except if body contains Appalachian Trail." The words "Appalachian Trail" remain underlined in order to indicate that they are a variable, which may be edited by selecting the underlined text in the rule description area 810 of the exceptions window 800. As mentioned above, the window or dialog that allows a user to define a variable will vary depending on the type of variable being defined.

When the user has finished selecting exceptions and providing any required variables, the user selects the Next control 630 or Finish control 835. This causes the method 550 (FIG. 5) to proceed from state 585 to state 595.

At state 595 the Rules Wizard displays an naming window, which allows the user to select name the rule and turn it on or off. Once the rule is named, the rule is stored in the user's MAPI profile. At that point, the Rules Wizard is removed from the display and the method 550 returns to the idle state 555.

From the foregoing description, advantages of the present invention should be immediately apparent. For example, the Rules Wizard provides step-by-step guidance during rule creation and editing. The Rules Wizard uses a sequence of windows to walk the user through the process of creating a rule. The Start/Templates window provides a list of available template options and allows the user to view and edit previously created rules. The Conditions window directs the user to select the conditions on which the rule will act. The Actions window allows the user to choose the action the rule will execute. The Exceptions window gives the user a listing of available exceptions. Finally, the Naming window allows the user to name the rule and turn it on or off.

To modify an existing rule, the user selects the existing rule from a dialog. If the user simply wants to redefine a variable, he or she clicks the hypertext and selects from the dialog. If the user wants to change the structure of the rule, the user will be guided by the Rules Wizard.

Displaying the rules in a natural language format also allows users to create rules by stepping through a logical sequence (i.e., conditions, actions, exceptions) and piecing together clauses of natural language (e.g., English) text. Each clause may have one or more variables that need to be defined by the user. When completed, the rule reads like a natural language sentence. Natural language rules more accurately reflect the way users think about organizing mail and is more like the way people give instructions to other people. This approach completely avoids the need to think in a programming-like syntax or to type in rules from scratch.

The variables in the displayed rules are displayed as hypertext. When a user selects the variable, a dialog is displayed with the appropriate user interface for selecting the folder, user, etc. that is required to define the variable. Once selected, the user-selected variable is threaded back into the natural language sentence. Because the variable maintains it hypertext properties, it makes it easy for the user to determine exactly which parts of the rule are variable, and provides a consistent path for modifying the variables.

The "OUTLOOK 97" program also provides rules templates and "rules from context" features that further simply the process of creating rules.

Rule templates wrap common combinations of discrete conditions, actions, and exceptions into packages. When a user selects a particular template (FIG. 5, state 560) the associated conditions, actions, and exceptions are immediately displayed in the rule description area of the conditions window, with the variables displayed as hypertext links. After the rule has been displayed in the rule description area, the user proceeds to select the underlined variables and define values for those variables. This allows a user to quickly create a rule by selecting a template and defining the required parameters. A list of exemplary templates is provided in Table IV.

TABLE IV assign categories based on keyword
notify me when important messages arrive
file new messages based on keyword
ignore a conversation
flag messages from someone special
assign categories to sent items
file new messages from someone special
file new messages sent to a distribution list
flag message I send to someone special
notify me when private messages arrive For example, if the user selects the template entitled "file new messages from someone special" the Rules Wizard will then display a conditions window (FIG. 5, step 565) with the following rule displayed in the rule description area 610: "For each message from an address list file it in the designated folder." The user must then complete the rule by defining the address list and folder variables.

The "rules from context" features allows a user to create new rules based on the specific information in an existing message. If the user selects the rules from context feature from a mail window, the Rules Wizard no longer blindly offers its generic choices of conditions and actions. Instead, the Rules Wizard examines the properties of the selected message and offers "custom" suggestions for the variables in available conditions and actions statements. This is accomplished by splicing information from the active message and incorporating it into the natural language expression of the conditions and actions. Thus, the user creates a rule using the user interface provided by the Rules Wizard. However, the parameters from the selected, existing message are already threaded into the natural language statements.

If a user opens an e-mail message and then invokes the Rules Wizard, the Wizard will give the user the option of generating a rule that acts on parameters that are similar to the message that is currently open. FIG. 9a illustrates a conditions window 900 that will be displayed if a user selects the Rules Wizard while viewing a message that is from Tom Smith, has the subject "Hiking Equipment Sale," and is located in a folder entitled "Hiking." As illustrated in FIG. 9a, the Rules Wizard has extracted the salient features from the open messages and threaded parameters from that message into the available conditions, which are displayed in a conditions display area 905.

Once the user chooses a condition or set of conditions, the Rules Wizard will offer several custom actions. FIG. 9b illustrates an actions window 910 with custom actions derived from the message in the example. Those skilled in the art will appreciate that the standard conditions and actions are still available and that other than expanding the choice of conditions and actions available, the Rules from Context feature does not alter the functionality of the Rules Wizard in any way.

To obtain the parameters that are displayed in the natural language rules that are created, the Rules from Context feature examines the relevant properties of the message on which it acts. The header fields or properties contain information such as the sender's name, the subject, the importance level, the sensitivity level, etc. The program then splices relevant information into natural language phrases. Those skilled in the art will appreciate that although the variables are automatically defined by the Rules from Context feature, they still maintain their hypertext properties and can be changed. Rules from Context streamlines the process of creating rules, which allows the user to be more efficient in his or her use of electronic messages. However, the feature does not limit the flexibility of the Rules system in any way because users still have the option to alter suggestions made by the Rules from Context.

The rules feature also provides independent client/server implementation of the rules. Those skilled in the art will appreciate that a client/server implementation is one in which many personal computers, referred to as clients, are connected to a central computer, called the server. While the clients maintain all of the functionality of personal computer, their connection to the server allows them to communicate with other clients through the server and to receive server-based services, such as mail services. Current mail systems allow a user to have a mailbox on the server as well as a mailbox on their client computer. The user can have mail delivered directly to either account. For example, the "OUTLOOK 97" program allows multiple transport providers to be registered in the user's MAPI profile. A user may have their company-related e-mail account on a server (e.g., a "Microsoft Exchange" server) and an Internet mail account on his or her on personal computer. In this case, the e-mail will be delivered to the user's inbox on the client computer by different transport providers.

The rules feature in the "OUTLOOK 97" program is a true client/server implementation because rules can act upon messages delivered to either the server or the client. This allows mail to be processed at the server even if the user's computer is not operating. Because the rules execute in two locations, the system automatically maintains rule synchronization between the client and the server. If rules are modified while a client is off-line, the rules are synchronized with the user's server the next time the client is connected to the server. This is accomplished by comparing the current set of client-based rules to the rules on the server. If there is a discrepancy, the user selects which set of rules he or she prefers to use, and the old rules on the client or server are updated accordingly.

Those skilled in the art will appreciate that not all rules can be run on the server because one or more of the conditions, actions, or exceptions is dependent on the client being logged in. When a rule is constructed, the program determines whether the rules includes client-dependent components. If so, the rule may not run on the server and resides solely on the client. If the rule does not include any client-dependent components, the rule will be uploaded to the server and registered with the user's mail server. Rules that are uploaded to the server will also be retained on the client. By implementing all rules on the client as client based rules, the system ensures that messages delivered to the user's inbox will be processed by the rules regardless of which transport provider delivered the message. In other words, a user may receive mail from multiple servers, and some of the servers may not be able to process rules. By having client rules, the rules are processed regardless of whether the message is received from a server that can or cannot process rules. However, by running the rule on the server when possible, the system ensures that messages will be processed quickly and efficiently even if the client is not logged in. If a rule is run on a message at the server, that rule will not be run again when the message reaches the client computer.

SUMMARY OF THE DETAILED DESCRIPTION

From the foregoing description, it will be appreciated that the present invention provides an improved system and method for creating, editing, and distributing rules for processing electronic messages. In an exemplary system, a Rules Wizard provides simple, step-by-step guidance through the rule making process. At each step, rules are constructed from natural language phrases that are selected by the user. As a condition, action, or exception is selected, the rules is displayed in a natural language format. Any variables in the natural language representation of the rule are highlighted and displayed as hypertext links. When the variable is specified by the user, the generic variable is replaced with the specific information provided by the user. Rule creation is further facilitated by choosing a predefined template, or by creating a new rule based on the properties of a currently open message. Finally, the rules are distributed between the client and server and synchronized in order to process messages in the most efficient and timely manner.

The foregoing system may conveniently be implemented in one or more program modules that are based upon the state diagram of FIG. 5, and the features illustrated in FIGS. 6–9. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the invention was described in the context of a program in which the conditions, actions, exceptions, and templates are predefined, those skilled in the art will appreciate that the present invention is extensible and that system administrators may be able to implement rules components and templates in addition to those described herein.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system having a graphical user interface including a display device and a user interface selection device, a method for constructing a rule for processing electronic messages, comprising the steps of:

displaying on the display device the current state of the rule in a natural language format comprising a text-based sentence formed by a contiguous string of appended clauses;

displaying on the display device a plurality of conditions upon which the rule will cause action to be taken, each condition represented by a clause that can be appended to the rule;

receiving from the user interface selection device an input signal indicating the selection of one of the conditions;

in response to the selection of one of the conditions, adding the clause representing the selected condition to the displayed current state of the rule;

displaying on the display device a plurality of actions that may be taken in response to the selected condition, each action represented by a clause that can be appended to the rule;

receiving from the user interface selection device an input signal indicating the selection of one of the actions; and in response to the selection of one of the actions, adding the clause representing the selected action to the displayed current state of the rule, the natural language sentence for the rule including the appended clauses of the selected condition and the selected action.

2. The method of claim 1, further comprising the steps of:

displaying on the display device a list of exceptions to the selected condition, each exception represented by a clause that can be appended to the rule;

receiving from the user interface selection device an input signal indicating the selection of one of the exceptions; and in response to the selection of one of the exceptions, adding the clause representing the selected exception to the displayed current state of the rule, the natural language sentence for the rule including the appended clauses of the selected condition, the selected action and the selected exception.

3. The method of claim 1, wherein the displayed current state of the rule includes a variable displayed as a highlighted object, and further comprising the steps of:

receiving from the user interface selection device an input signal indicating the selection of the highlighted object;

in response to the selection of the highlighted object, displaying on the display device a user interface object including a definition for the variable;

receiving from the user interface selection device an input signal indicating the definition of the variable; and in response to the definition of the variable, displaying on the display device the current state of the rule with the definition in place of the variable.

4. The method of claim 1, further comprising the step of examining properties associated with an existing message; and wherein the plurality of conditions and plurality of actions include a plurality of displayed variables derived from the properties associated with the existing message.

5. The method of claim 1, further comprising the steps of:

determining whether the rule may be run on a server; and in response to the rule being able to be run on the server, uploading the rule to the server.

6. The method of claim 1, further comprising the step of storing the rule for subsequent processing of electronic messages.

7. The method of claim 6, wherein the rule is stored on the computer system and on a server associated with the computer system.

8. The method of claim 7, wherein the rule is executed on only one of the computer system and the server.

9. The method of claim 7, further comprising the step of synchronizing rules stored on the computer system with rules stored on the server.

10. The method of claim 1, wherein the rule is used to process electronic messages stored in a folder.

11. A computer-implemented method for constructing a rule for processing electronic messages, comprising the steps of:

displaying a condition window comprising a rule section presenting the current state of the rule in a natural language format and a condition section presenting a plurality of conditions upon which the rule will cause action to be taken, the rule section displayed separate from the condition section within the condition window;

receiving an input signal indicating the selection of one of the conditions;

in response to the selection of one of the conditions, adding the selected condition to the displayed current state of the rule within the rule section of the condition widow;

responsive to an input signal associated with a command, displaying an action window comprising a rule section presenting the current state of the rule in a natural language format and an action section presenting a plurality of actions that may be taken response to the selected condition, the rule section displayed separate from the action section within the action window;

receiving input signal indicating the selection of one of the actions; and in response to the selection of one of the actions, adding the selected action to the displayed current state of the rule within the rule section of the action window, the displayed current state of the rule within the action window comprising a text-based sentence formed by a contiguous string of appended clauses corresponding to the selected condition and the selected action.

12. The computer-implemented method of claim 11, further comprising the steps of:

responsive to an input signal associated with a command, displaying an exception window comprising a rule section comprising the current state of the rule in a natural language format and a list of exceptions associated with the selected condition;

receiving an input signal indicating the selection of one of the exceptions; and in response to the selection of one of the exceptions, adding the selected exception to the displayed current state of the rule within the rule section of the exception window, the displayed current state of rule within the exception window comprising a natural language sentence including appended clauses corresponding to the selected condition, the selected action, and the selection exception.

13. The method of claim 11, wherein the displayed current state of the rule in the rule section of the condition window includes a variable displayed as a highlighted object, and further comprising the steps of:

receiving an input signal indicating the selection of the highlighted object;

in response to the selection of the highlighted object, displaying a user interface object including a definition for the variable;

receiving an input signal indicating the definition of the variable; and in response to the definition of the variable, displaying in the rule section of the condition window the current state of the rule with the definition in place of the variable.

14. The method of claim 13, further comprising the step of examining properties associated with an existing message; and wherein the plurality of conditions and plurality of actions include a plurality of displayed variables derived from the properties associated with the existing message.

15. The computer-implemented method of claim 11, further comprising the steps of:

displaying a template window comprising a plurality of rule templates;

receiving an input signal indicating the selection of one of the rule templates, wherein the plurality of conditions and the plurality of actions are associated with the selected rule template.

16. A computer-readable medium having computer-executable instructions for performing the steps of:

displacing a condition window comprising a rule section presenting the current state of the rule in a natural language format and a condition section presenting a plurality of conditions upon which the rule will cause action to be taken, the rule section displayed separate from the condition section within the condition window;

receiving an input signal indicating the selection of one of the conditions;

in response to the selection of one of the conditions, adding the selected condition to the displayed current state of the rule within the rule section of the condition widow;

responsive to an input signal associated with a command, displaying an action window comprising a rule section presenting the current state of the rule in a natural language format and an action section presenting a plurality of actions that may be taken in response to the selected condition, the rule section displayed separate from the action section within the action window;

receiving input signal indicating the selection of one of the actions; and in response to the selection of one of the actions, adding the selected action to the displayed current state of the rule within the rule section of the action window, the displayed current state of the rule within the action window comprising a text-based sentence formed by a contiguous string of appended clauses corresponding to the selected condition and the selected action.

17. A computer-readable medium having computer-executable instructions for performing steps comprising:

displaying within a conditions window a plurality of conditions upon which a rule for processing electronic messages will cause an action to be taken;

receiving an input signal indicating the selection of one of the conditions;

displaying within an actions window a plurality of actions that may be taken in response to the selected condition;

receiving an input signal indicating the selection of one of the actions;

displaying within the actions window the current state of the rule in a natural language format presented as a contiguous string of appended clauses corresponding to the selected condition and the selected action, the rule further comprising a variable displayed as a highlighted object;

receiving an input signal indicating the selection of the highlighted object;

in response to the selection of the highlighted object, displaying a dialog including a definition for the variable;

receiving an input signal indicating the selection of the definition for the variable;

in response to the selection of the definition of the variable, displaying within the action window the current state of the rule as a text-based, natural language sentence comprising the appended clauses with the definition in place of the variable; and storing the rule for subsequent processing of electronic messages.

18. The computer readable medium of claim 17, wherein the instructions further perform the steps of:

displaying an exceptions window comprising a list of exceptions associated with the selected condition;

receiving an input signal indicating the selection of one of the exceptions; and in response to the selection of one of the exceptions, displaying within the exceptions window the current state of the rule in a natural language format presented as a contiguous string of appended clauses corresponding to the selected condition, the selected action and the selected exception.

19. The computer readable medium of claim 17, wherein the instructions further perform the steps of:

determining whether the rule may be run on a server; and in response to the rule being able to be run on the server, uploading the rule to the server.

20. A computer-implemented method for constructing a rule for processing electronic messages, comprising the steps of:

displaying a templates window comprising a plurality of rule templates for viewing and editing previously created rules;

responsive to selection of one of the rule templates, displaying a conditions window comprising a plurality of conditions associated with the selected rule template and upon which the rule will act;

responsive to selection of one of the conditions, displaying an actions window comprising a plurality of actions that may be taken in response to occurrence of the selected condition; and responsive to selection of one of the actions, displaying within the actions window a natural language sentence comprising the rule defined by appended text-based clauses corresponding to the selected condition and the selected action.

21. The method of claim 20 further comprising the steps of:

displaying an exceptions window comprising exceptions to the selected condition; and responsive to selection of one of the exceptions, displaying within the exceptions window a natural language sentence comprising appended text-based clauses corresponding to the selected condition, the selected action and the selected exception.

22. A computer-implemented method for constructing a rule for processing electronic messages, comprising the steps of:

displaying a condition window comprising a plurality of conditions upon which the rule will cause action to be taken, the condition window further presenting the current state of the rule in a natural language format comprising a a text-based sentence formed by a contiguous string of appended clauses;

receiving an input signal indicating the selection of one of the conditions;

in response to the selection of one of the conditions, adding the selected condition to the current state of the rule and updating the presentation of the current state of the rule within the condition widow by appending a clause associated with the selected condition to the text-based sentence;

displaying an action window comprising a plurality of actions that may be taken in response to the selected condition, the action window further presenting the current state of the rule in the natural language format;

receiving an input signal indicating the selection of one of the actions; and in response to the selection of one of the actions, adding the selected action to the current state of the rule and updating the presentation of the current state of the rule the action widow by appending a clause associated with the selected action to the text-based sentence.

23. The computer-implemented method of claim 22, further comprising the steps of:

displaying an exceptions window comprising a plurality of exceptions to the selected condition, the exceptions window further presenting the current state of the rule in the natural language format;

receiving an input signal indicating the selection of one of the exceptions; and in response to the selection of one of the exceptions, adding the selected exception to the current state of the rule and updating the presentation of the current state of the rule within the exceptions widow by appending a clause associated with the selected exception to the text string.

24. The method of claim 22, wherein the current state of the rule presented in the condition window includes a variable displayed as a highlighted object, and further comprising the steps of:

receiving an input signal indicating the selection of the highlighted object;

in response to the selection of the highlighted object, displaying a user interface object including a definition for the variable;

receiving an input signal indicating the definition of the variable; and in response to the definition of the variable, displaying in the condition window the current state of the rule with the definition in place of the variable.

25. The computer-implemented method of claim 22, further comprising the steps of:

displaying a template window comprising a list of rule templates;

receiving an input signal indicating the selection of one of the rule templates, wherein the plurality of conditions and the plurality of actions are associated with the selected rule template.

26. In a computer system having a graphical user interface including a display device and a user interface selection device, a method for constructing a rule for processing electronic messages, comprising the steps of:

displaying on the display device a plurality of conditions upon which the rule will cause action to be taken;

receiving from the user interface selection device an input signal indicating the selection of one of the conditions;

in response to the selection of one of the conditions, adding the selected condition to the current state of the rule and presenting the current state of the rule in a natural language format comprising a text-based string including a clause associated with the selected condition;

displaying on the display device a plurality of actions that may be taken in response to the selected condition;

receiving from the user interface selection device an input signal indicating the selection of one of the actions; and in response to the selection of one of the actions, adding the selected action to the current state of the rule and presenting the current state of the rule in the natural language format by appending a clause associated with the selected action to the text-based string, thereby forming a natural language sentence of appended selected condition and action clauses.

27. The method of claim 26, further comprising the steps of:

displaying on the display device a plurality of exceptions to the selected condition;

receiving from the user interface selection device an input signal indicating the selection of one of the exceptions; and in response to the selection of one of the exceptions, adding the selected exception to the current state of the rule and presenting the current state of the rule in the natural language format by appending a clause associated with the selected exception to the text-based string, thereby forming a natural language sentence containing the selected condition, selected action and selected exception clauses.

28. The method of claim 26, further comprising the steps of:

determining whether the rule may be run on a server; and in response to the rule being able to be run on the server, uploading the rule to the server.

29. The method of claim 26, further comprising the step of storing the rule for subsequent processing of electronic messages, wherein the rule is stored on the computer system and on a server associated with the computer system and the rule is executed on only one of the computer system and the server.

30. The method of claim 29, further comprising the step of synchronizing rules stored on the computer system with rules stored on the server.

31. The method of claim 26, wherein the rule is used to process electronic messages stored in a folder.

* * * * *